(12) United States Patent
Zuzelo

(10) Patent No.: US 7,287,310 B2
(45) Date of Patent: *Oct. 30, 2007

(54) METHOD OF FORMING AND ATTACHING A BLADE THAT CAN RECEIVE BOTH SYMMETRICAL AND ASYMMETRICAL ARBORS

(76) Inventor: Edward Zuzelo, P.O. Box 450, Conshohocken, PA (US) 19428

( * ) Notice: Subject to any disclaimer, the term of this patent is extended or adjusted under 35 U.S.C. 154(b) by 293 days.

This patent is subject to a terminal disclaimer.

(21) Appl. No.: 10/668,894

(22) Filed: Sep. 23, 2003

(65) Prior Publication Data

US 2004/0156188 A1 Aug. 12, 2004

Related U.S. Application Data

(63) Continuation-in-part of application No. 10/358,806, filed on Feb. 6, 2003, now Pat. No. 6,651,644.

(51) Int. Cl.
*B23P 13/04* (2006.01)
*B28D 1/04* (2006.01)

(52) U.S. Cl. .......................................... 29/557; 125/15

(58) Field of Classification Search .................. 29/557; 125/15, 12, 13.01; 451/490, 508, 540, 541; 83/665, 666

See application file for complete search history.

(56) References Cited

U.S. PATENT DOCUMENTS

| | | | |
|---|---|---|---|
| 2,572,042 A * | 10/1951 | Martin | 451/342 |
| 2,822,648 A * | 2/1958 | Metzger et al. | 451/342 |
| 4,730,952 A * | 3/1988 | Wiley | 403/316 |
| 4,854,295 A * | 8/1989 | Sakarcan | 125/15 |
| 5,477,845 A * | 12/1995 | Zuzelo | 125/15 |
| 5,660,161 A * | 8/1997 | Chiuminatta et al. | 125/15 |
| 5,901,629 A * | 5/1999 | Stroud | 83/665 |
| 6,230,600 B1 * | 5/2001 | Stroud | 83/665 |
| 6,321,627 B1 * | 11/2001 | Taylor et al. | 83/665 |
| 6,340,022 B1 * | 1/2002 | Schroer | 125/13.01 |
| 6,651,644 B1 * | 11/2003 | Zuzelo | 125/15 |
| 6,691,596 B1 * | 2/2004 | Singh et al. | 83/13 |
| 6,729,220 B2 * | 5/2004 | Curtsinger et al. | 83/666 |
| 6,846,223 B2 * | 1/2005 | Conley et al. | 451/6 |

* cited by examiner

*Primary Examiner*—John C. Hong
(74) *Attorney, Agent, or Firm*—LaMorte & Associates

(57) ABSTRACT

A method of forming a rotating blade for a cutting machine that can attach to either symmetrical arbors or asymmetrical arbors. The arbor mounting hole has five sides arranged in a cut gem configuration. The arbor mounting hole is symmetrical on either side of a mid-line. However, the mid-line of the arbor mounting hole need not pass through the geometric center of the blade. Inserts are provided. The inserts fit into the arbor mounting hole. Each of the inserts defines an aperture for receiving a drive arbor of a different configuration. The apertures are off-set in the inserts, to compensate for the off-set arbor mounting hole, so that the apertures are disposed at the geometric center of the blade when any insert is placed in the arbor mounting hole.

3 Claims, 4 Drawing Sheets

METHOD OF FORMING AND ATTACHING A BLADE THAT CAN RECEIVE BOTH SYMMETRICAL AND ASYMMETRICAL ARBORS

RELATED APPLICATIONS

This application is a Continuation-In-Part of U.S. patent application Ser. No. 10/358,806, filed Feb. 6, 2003 now U.S. Pat. No. 6,651,644 and entitled Blade For Circular Saw Having Universal Mounting Hole For Receiving A Plurality Of Symmetrical And Asymmetrical Arbors.

BACKGROUND OF THE INVENTION

1. Field of the Invention

The present invention relates to the arbor mounting hole structure of circular saw blades. More particularly, the present invention relates to circular saw blades that have arbor mounting holes that can be attached to diverse cutting machines having either symmetrical or asymmetrical drive arbor configurations.

2. Prior Art Statement

There are many types of cutting machines that utilize circular saw blades. Circular saw blades are typically round blades having cutting teeth along the periphery of the blade. Traditionally, an arbor mounting hole is disposed in the center of the blade. The arbor mounting hole passes over a rotating drive arbor of the cutting machine, thereby interconnecting the drive arbor of the cutting machine to the circular saw blade. The interconnection of the blade arbor mounting hole with the drive arbor of the cutting machine serves two purposes. First, the interconnection of the drive arbor with the blade arbor mounting hole centers the blade so that the blade is balanced when it spins. Second, the interconnection of the drive arbor with the blade arbor mounting hole helps the drive arbor to turn the blade.

The most common type of arbor mounting hole, used on a circular saw blade, is a round hole that is located in the geometric center of the circular saw blade. Such arbor mounting holes pass over round cutting machine arbors that have a diameter close to that of the arbor mounting hole. In such round arbor mounting hole blades, any blade that has a round arbor mounting hole of the proper diameter can be mounted on the cutting machine.

In certain applications, non-circular arbors are used on cutting machines to provide a more positive connection between a circular saw blade and the rotating arbor. By using non-round arbors on the cutting machine and non-round arbor mounting holes in the blades, the blades are prevented from rotating around the arbor, should the saw blade bind on the material it is cutting. Such non-round arbor mounting holes are typically symmetrically disposed around the geometric center of the circular saw blade. Circular saw blades with symmetrical square-shaped arbor mounting holes are exemplified by U.S. Pat. No. 3,869,795 to Treace, entitled, Cutting Blade For Use With An Oscillating Cast Cutter; U.S. Pat. No. 4,706,386 to Wiley, entitled Quick Change Mechanism For Diamond Arbor Circular Saw Blades And Other Spinning Disc Devices; and U.S. Pat. No. 2,822,648 to Metzger, entitled Rotary Tool Mounting And Method Of Assembling The Same.

Circular saw blades with symmetrical diamond shaped arbor mounting holes are exemplified by U.S. Pat. No. 2,795,247 to Topolinski, entitled Reversible Circular Saw; and U.S. Pat. No. 2,649,868 to Gommel, entitled Mounting Rotors On Arbors Of Various Transaxial Contours.

Circular saw blades with symmetrical triangular shaped arbor mounting holes are exemplified by U.S. Pat. No. 2,997,819 to Schacht.

In the wide cross-section of industry that produces cutting machines, some companies have developed cutting machines with asymmetrical drive arbors that are proprietary to the manufacturer. Such asymmetrical drive arbors only accept circular saw blades having arbor mounting holes that are specifically manufactured for that cutting machine. Accordingly, a customer must purchase specialized blades from a specific manufacturer in order to utilize the cutting machine manufactured by that manufacturer. In some instances, the arbor mounting hole on such blades is an asymmetric triangle. Such a configuration is found in U.S. Pat. No. 5,477,845, to Zuzelo, entitled Saw Blade And Mounting Means For The Same. Other blades have arbor mounting holes that are combinations of straight sides and curved sides. Such prior art blades are exemplified by U.S. Pat. No. 2,572,042 to Martin, entitled Means For Mounting Cutting Blades On Shafts; U.S. Pat. No. 5,603,310 to Chiuminatta, entitled Mounting Arbor For Saw Cutting Blades; U.S. Pat. No. 5,373,834 to Chiuminatta, entitled Mounting Arbor For Saw Cutting Blades; U.S. Pat. No. 5,303,688 to Chuminatta, entitled Mounting Arbor For Saw Cutting Blades; and U.S. Pat. No. 5,660,161 to Chuminatta, entitled Mounting Arbor For Saw Cutting Blades.

As is often the case, contractors and manufacturers who utilize cutting machines have different brands of cutting machines that were purchased at different times. A manufacturer would like to have the ability to exchange blades between the different cutting machines in order to reduce blade inventory and save money. However, if the cutting machines require specialized blades, a contractor or manufacturer has no choice but to purchase specialized blades for each of the cutting machines.

A need therefore exists for a new circular saw blade, having an arbor mount that can be attached to different types of cutting machine arbors, even though some arbors may be symmetrical and others asymmetric. This will enable a manufacturer or contractor to purchase one set of blades that can be used on a variety of different cutting machines. This need is met by the present invention as described and claimed below.

SUMMARY OF THE INVENTION

The present invention is the method of forming a rotating blade and attaching it to a cutting machine with an asymmetrically formed mounting arbor. The blade defines an arbor mounting hole. The arbor mounting hole has five sides arranged in a cut gem configuration. The arbor mounting hole is symmetrical on either side of a mid-line. However, the mid-line of the arbor mounting hole need not pass through the geometric center of the blade.

Inserts can be provided. The inserts fit into the arbor mounting hole. Each of the inserts defines an aperture for receiving a drive arbor of a different configuration. The apertures are off-set in the inserts, to compensate for the off-set arbor mounting hole, so that the apertures are disposed at the geometric center of the blade when any insert is placed in the arbor mounting hole.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be utilized on many types of circular saw blades that are rotated by cutting machines, such as composite masonry blades and composite metal grinding blades, the present invention is particularly well suited for use on metal blades of the type that have either cutting teeth or diamond abrasion pads disposed along the peripheral edge of the blade.

Figure 1:
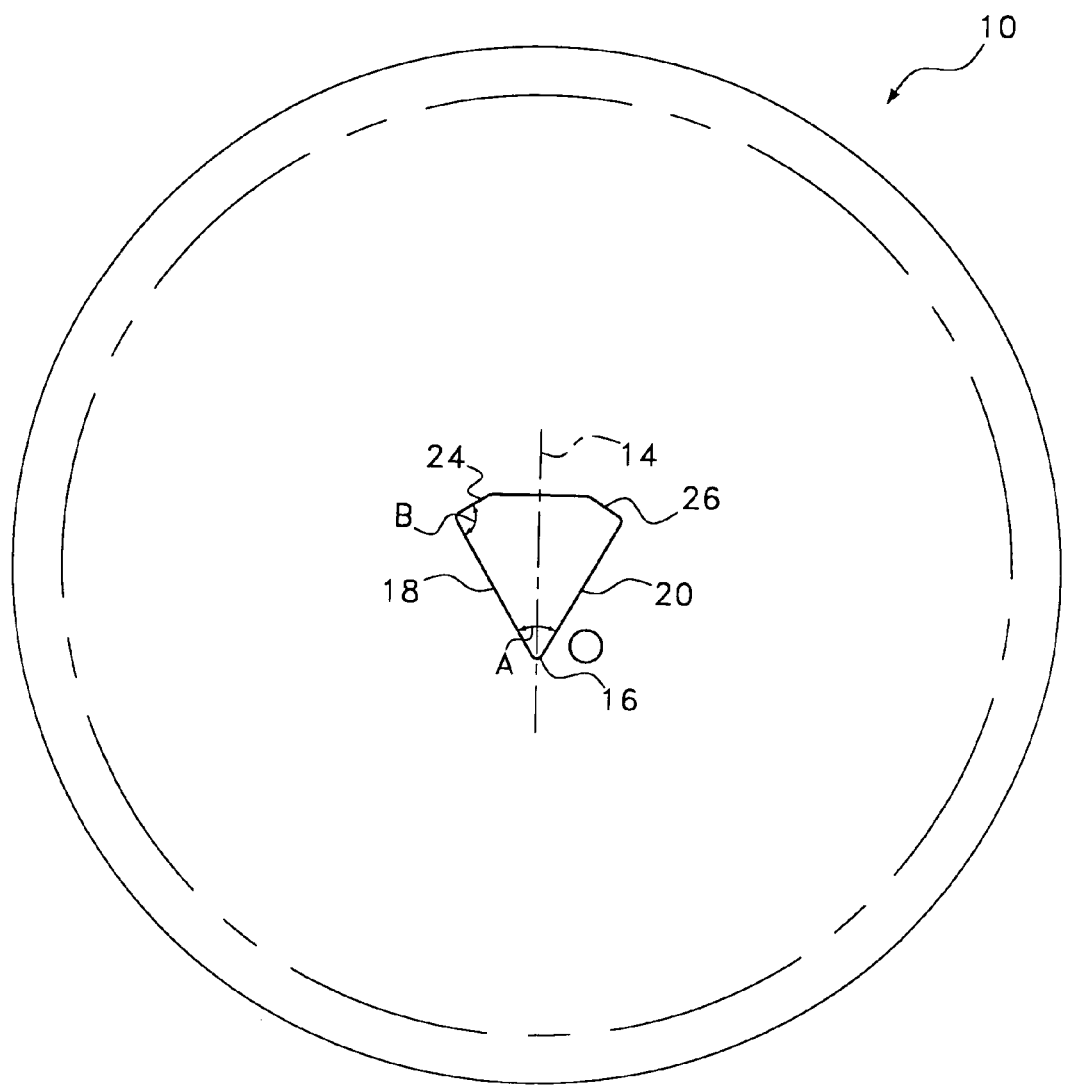
FIG. 1 is a front view of a circular blade having an arbor mounting hole in accordance with the present invention.

Referring to FIG. 1, an exemplary embodiment of a circular saw blade 10 is shown having an arbor mounting hole 12 in accordance with the present invention. The arbor mounting hole 12 has a cut-gem shape that is similar to that of the profile of a diamond having a traditional solitaire cut.

The arbor mounting hole 12 is symmetrically disposed on either side of an imaginary mid-line 14. As such, the dimensions of the arbor mounting hole 12 are identical on either side of the mid-line 14, except that those dimensions are mirror images. The arbor mounting hole 12 is defined by five flat side edges that meet at five rounded intersections.

Referring to the orientation of the arbor mounting hole 12 illustrated in FIG. 1, it can be seen that the arbor mounting hole 12 has a bottom intersection 16. Two long side edges 18, 20 diverge from the bottom intersection at an angle A of between 50 degrees and 70 degrees, with the preferred divergence being near or at 60 degrees. The length of both of the long side edges 18, 20 are identical. Furthermore, the angle between each of the long side edges 18, 20 and the mid-line are also identical and are equal to half the angle of divergence A.

The arbor mounting hole 12 has a top edge 22 that lay perpendicular to the mid-line 14, wherein the mid-line 14 bisects the top edge 22. The top edge 22 has a length that is between 50% and 75% of the length of either of the long side edges 18, 20.

Short side edges 24, 26 interconnect the ends of the top edge 22 to the ends of the long side edges 18, 20. Each of the intersection points between the short side edges 24, 26 and both the top edge 22 and the long side edges 18, 20 have the some radius of curvature, as does the bottom intersection. The short side edges 24, 26 have a length of between 40 percent and 60 percent the length of the top side edge 22. Furthermore, the short side edges 24, 26 intersect the long side edges 18, 20 at an angle B of between 15 degrees and 40 degrees.

Figure 2:
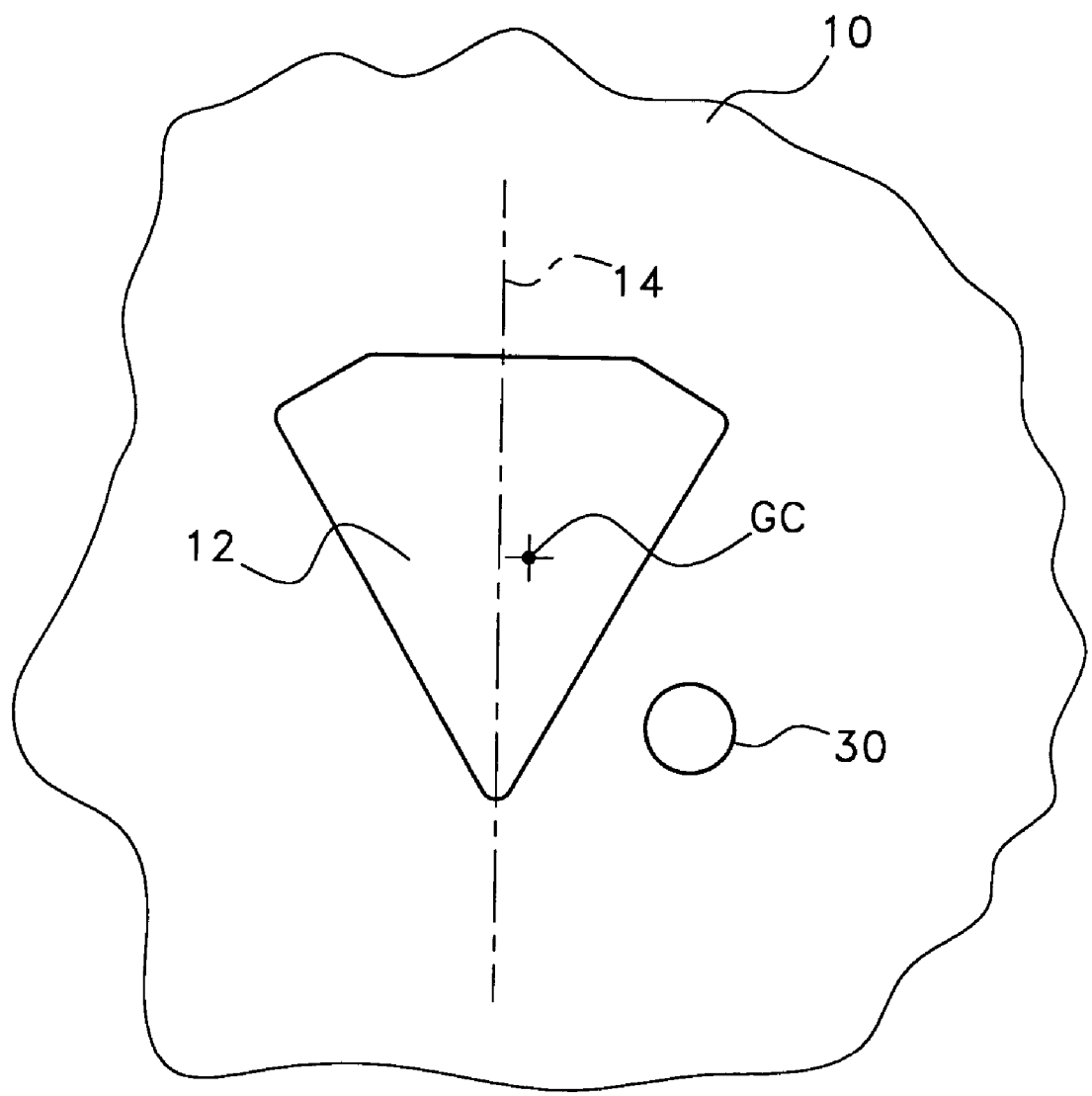
FIG. 2 is an enlarged view of the arbor mounting hole shown in FIG. 1.

Referring to FIG. 2, it will be understood that the circular saw blade 10 has a geometric center point GC. However, the mid-line 14 of the arbor mounting hole 12 need not pass through the geometric center GC of the blade 10. Rather, the mid-line 14 of the arbor mounting hole 12 can be displaced laterally from the geometric center GC of blade 10 by a few hundreds of an inch. Accordingly, the arbor mounting hole 12, although symmetric around its own mid-line 14, is not symmetrically disposed in the geometric center GC of the blade 10. Such a lateral displacement is necessary for the arbor mounting hole 12 to properly engage the drive arbors of some commercially available cutting machines.

Some circular saws have pins that engage a secondary hole that is positioned adjacent to the arbor mounting hole. An optional hole 30 can therefore be formed in the material of the blade 10 adjacent to the arbor mounting hole 12.

Figure 3:
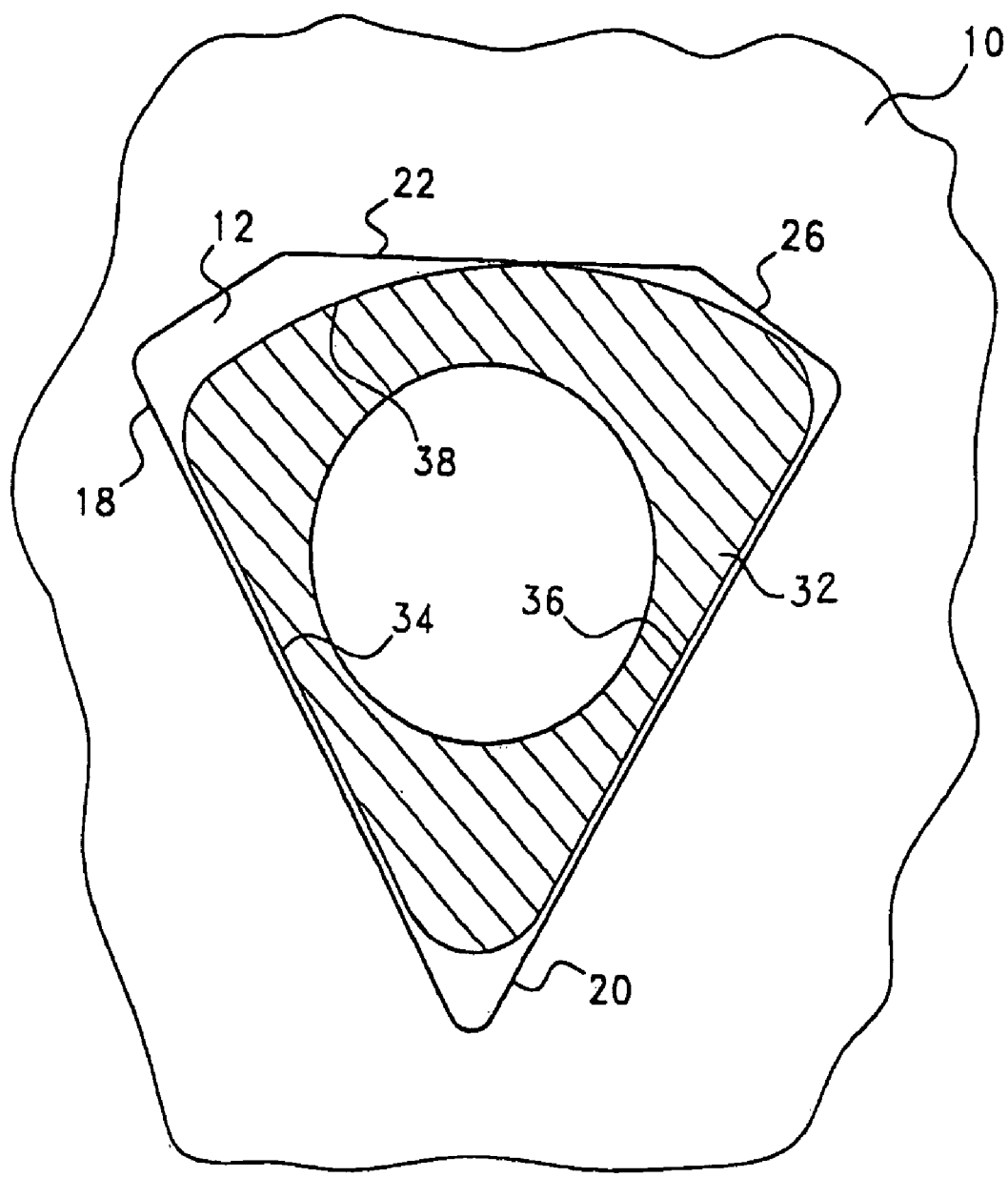
FIG. 3 is a front view of a blade engaging an asymmetrical drive arbor.

Referring to FIG. 3, the arbor mounting hole 12 previously described with regard to FIG. 1 is shown engaging an asymmetrical drive arbor 32. The asymmetrical drive arbor 32 has two straight sides 34, 36 of uneven length and an arcuate side 38 that connects the straight sides 34, 36. As is shown, such an asymmetrical drive arbor 32 fits into the symmetrical arbor mounting hole 12 of the present invention. Once inserted into the arbor mounting hole 12, the straight sides 34, 36 of the drive arbor 32 contact the long side edges 18, 20 of the arbor mounting hole 12. The arcuate side 38 of the drive arbor 32 contacts both the top edge 22 of the arbor mounting hole 12 and one of the short side edges 26 of the arbor mounting hole 12. Accordingly, the asymmetrical drive arbor 32 contacts four of the five sides of the arbor mounting hole 12. With such a contact distribution, the circular saw blade 10 and the drive arbor 32 are physically interlocked and the drive arbor 32 cannot rotate without also rotating the circular saw blade 10.

Figure 6:
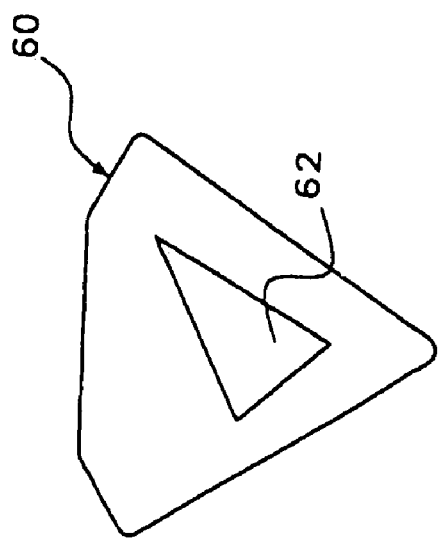
FIG. 6 is a front view of a third exemplary embodiment of an insert for use within the arbor mounting hole of a blade.
Figure 5:
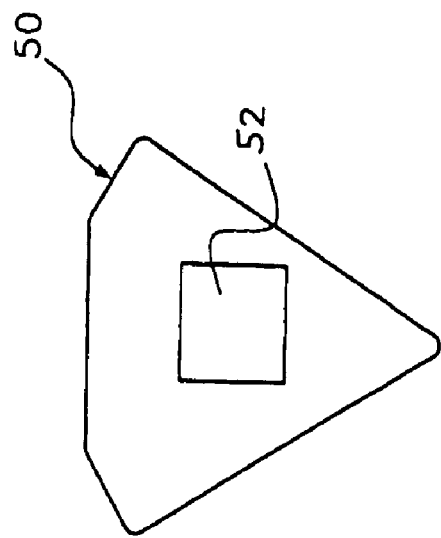
FIG. 5 is a front view of a second exemplary embodiment of an insert for use within the arbor mounting hole of a blade.
Figure 4:
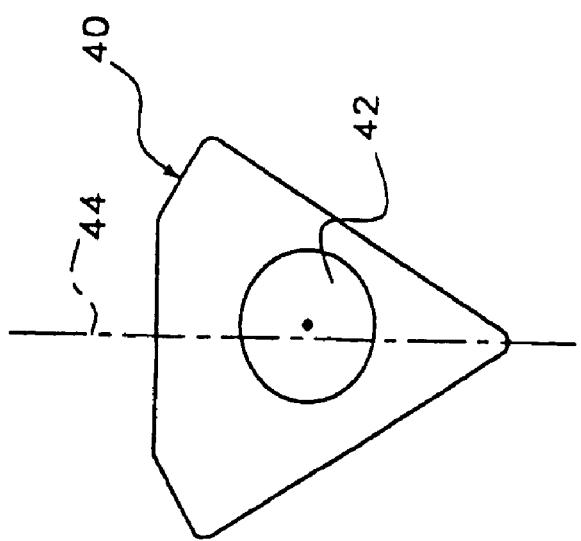
FIG. 4 is a front view of a first exemplary embodiment of an insert for use within the arbor mounting hole of a blade.

Referring to FIGS. 4, 5 and 6, a series of adaptors 40, 50, 60 are presented that enables the present invention to fit on a wide variety of different drive arbors. Each of the adaptors 40, 50, 60 is an insert that is shaped to be received within the arbor mounting hole 12 previously described in reference to FIG. 1. Each of the adaptors 40, 50, 60 defines an aperture of a particular configuration that corresponds to the drive arbor configuration of different cutting machines. In FIG. 4, the aperture 42 defined by the adaptor 40 is round. This enables the adaptor 40 to receive a traditional round drive arbor. In FIG. 5, the aperture 52 is square, to receive a square drive arbor. Lastly, in FIG. 6, the aperture 62 is an asymmetrical triangle to receive a similarly specially shaped drive arbor.

Looking back at FIG. 4, it will be understood that the adaptor 40 has a vertical mid-line 44 that would divide the insert into two equal, mirrored halves, if the aperture 42 were not present. However, in the shown embodiments, the vertical mid-line 44 does not pass through the center of the aperture 42. Rather, the aperture 42 is laterally off-set from the mid-line 44. The aperture 42 is laterally offset by the same distance that the arbor mounting hole 12 (FIG. 1) is off-set in the blade 10 (FIG. 1). As was previously described in FIG. 2, the mid-line of the arbor mounting hole 12 is off-set from the geometric center GC of the blade by a short distance. In each of the adaptors, the aperture defined by the adaptor is off-set in the opposite direction by the same distance. Accordingly, when any adaptor 40, 50, 60 is placed into the arbor mounting hole 12 (FIG. 1) of the blade, the center of the aperture 42, 52, 62 in the adaptors 40, 50, 60 exactly aligns with the geometric center GC (FIG. 2) of the blade.

It will be understood that the embodiments of the present invention that are described and illustrated herein are merely exemplary and a person skilled in the art can make many variations to the embodiments shown without departing from the scope of the present invention. For example, the circular saw blade can have any known configuration provided the present invention arbor mounting hole is used. Furthermore, the adaptors can have apertures corresponding to any known drive arbor configuration that is too small to otherwise be engaged by the described arbor mounting hole. All such variations, modifications and alternate embodiments are intended to be included within the scope of the present invention as defined by the appended claims.

What is claimed is:

1. A method of forming an arbor mounting hole in a circular blade that can be mounted on both symmetrical and asymmetrical mounting arbors, said method comprising the steps of:
   providing a circular blade having a geometric center;
   forming an arbor hole in said circular blade, wherein said arbor hole has at least five straight side edges that include;
   a first long side edge;
   a second long side edge, wherein said first long side edge and said second long side edge intersect at a first angle, and wherein said first angle is bisected by an imaginary mid-line;
   a top side edge;
   a first short side edge connecting said first long side edge to said top side edge; and
   a second short side edge connecting said second long side edge to said top side edge;
   wherein said imaginary midline is offset from the geometric center of said circular blade.

2. The method according to claim 1, wherein said first long side edge, said second long side edge, said top edge, said first short side edge and said second short side edge form the edges of a continuous hole having five points of intersection between sides.

3. The method according to claim 1, further including the step of providing at least one removable insert that is received by said arbor hole, wherein said insert defines a mounting hole having a center of rotation that aligns with the geometric center of said circular blade.

* * * * *